United States Patent
Gotou et al.

(10) Patent No.: US 12,199,292 B2
(45) Date of Patent: Jan. 14, 2025

(54) BATTERY WITH IMPROVED HEAT DISSIPATION

(71) Applicant: Panasonic Intellectual Property Management Co., Ltd., Osaka (JP)

(72) Inventors: Toshiya Gotou, Osaka (JP); Toshiyasu Kitamura, Osaka (JP); Mitsutoshi Tajima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 552 days.

(21) Appl. No.: 17/601,957

(22) PCT Filed: Apr. 14, 2020

(86) PCT No.: PCT/JP2020/016396
§ 371 (c)(1),
(2) Date: Oct. 7, 2021

(87) PCT Pub. No.: WO2020/213597
PCT Pub. Date: Oct. 22, 2020

(65) Prior Publication Data
US 2022/0190411 A1 Jun. 16, 2022

(30) Foreign Application Priority Data
Apr. 19, 2019 (JP) .................. 2019-080244

(51) Int. Cl.
*H01M 50/10* (2021.01)
*H01M 10/058* (2010.01)
(Continued)

(52) U.S. Cl.
CPC ....... *H01M 50/102* (2021.01); *H01M 10/058* (2013.01); *H01M 10/658* (2015.04); *H01M 50/103* (2021.01)

(58) Field of Classification Search
CPC ............. H01M 50/102; H01M 50/103; H01M 50/107; H01M 50/112; H01M 10/658;
(Continued)

(56) References Cited

U.S. PATENT DOCUMENTS
2013/0236770 A1   9/2013  Masuda

FOREIGN PATENT DOCUMENTS
JP        62-031368 U    2/1987
JP        2008-084650 A  4/2008
(Continued)

OTHER PUBLICATIONS

International Search Report of PCT application No. PCT/JP2020/016396 dated Jul. 7, 2020.
(Continued)

*Primary Examiner* — Raymond Alejandro
(74) *Attorney, Agent, or Firm* — Rimon P.C.

(57) ABSTRACT

A battery includes an electrode group, and a rectangular exterior casing that houses the electrode group and includes a tubular side wall, a bottom connected to a lower end of the side wall in a Z direction, and an opening provided at an upper end. An inner surface of the bottom of the exterior casing has a slope inclined with respect to a plane orthogonal to the Z direction. The electrode group is in thermal contact with the slope. The bottom may have a protrusion protruding inward in the Z direction of the exterior casing, and the slope may be formed on the protrusion.

10 Claims, 6 Drawing Sheets

(51) Int. Cl.
*H01M 10/658* (2014.01)
*H01M 50/102* (2021.01)
*H01M 50/103* (2021.01)

(58) Field of Classification Search
CPC ... H01M 10/659; H01M 10/66; H01M 10/058
See application file for complete search history.

(56) References Cited

FOREIGN PATENT DOCUMENTS

| | | | | |
|---|---|---|---|---|
| JP | 2014-157803 | | 8/2014 | |
| JP | 2015-049959 | | 3/2015 | |
| JP | 2015049959 A | * | 3/2015 | ............ H01M 10/04 |
| JP | 2016-171020 | | 9/2016 | |
| WO | 2014/109034 | | 7/2014 | |

OTHER PUBLICATIONS

The Extended European Search Report dated Jul. 21, 2022 for the related European Patent Application No. 20791351.8.

* cited by examiner

BATTERY WITH IMPROVED HEAT DISSIPATION

CROSS-REFERENCE TO RELATED APPLICATIONS

This application is a U.S. national stage application of the PCT International Application No. PCT/JP2020/016396 filed on Apr. 14, 2020, which claims the benefit of foreign priority of Japanese patent application No. 2019-080244 filed on Apr. 19, 2019, the contents all of which are incorporated herein by reference.

TECHNICAL FIELD

The present disclosure relates to a battery.

BACKGROUND ART

A conventional battery module is disclosed in PTL 1. This battery module is used as a battery of a vehicle, and includes a plurality of rectangular batteries electrically connected to each other, and a cooling plate that is in contact with each rectangular battery and cools the rectangular battery.

CITATION LIST

Patent Literature

PTL 1: International Publication No. WO 2014/109034 A

SUMMARY OF THE INVENTION

When rapid charge and discharge are performed in an onboard battery module, there is a possibility that Joule heat generated in the battery increases, and heat dissipation of the battery alone needs to be enhanced. Therefore, an object of the present disclosure is to provide a battery that can improve heat dissipation.

A battery according to the present disclosure includes: an electrode group; and a case that houses the electrode group and includes a side wall of a tubular shape, a bottom connected to a lower end of the side wall in a height direction, and an opening provided at an upper end. In the battery, the bottom includes an inner surface that is provided with a slope inclined with respect to a plane orthogonal to the height direction, and the electrode group is in thermal contact with the slope.

According to the battery of the present disclosure, the slope inclined with respect to the plane orthogonal to the height direction is provided on the inner surface of the case bottom. Therefore, the electrode group is easily brought into thermal contact with the case bottom, and the heat generated in the electrode group can be released through the case bottom. Furthermore, the electrode group is easily pressed toward the case side wall by normal force directly applied to the electrode group from the slope or indirectly applied to the electrode group through an insulating sheet. Therefore, by causing the electrode group to be easily brought into thermal contact with the case side wall, the heat generated in the electrode group can be more actively released through the side wall of the case. Therefore, heat release performance in the battery can be improved.

DESCRIPTION OF EMBODIMENT

Figure 1:
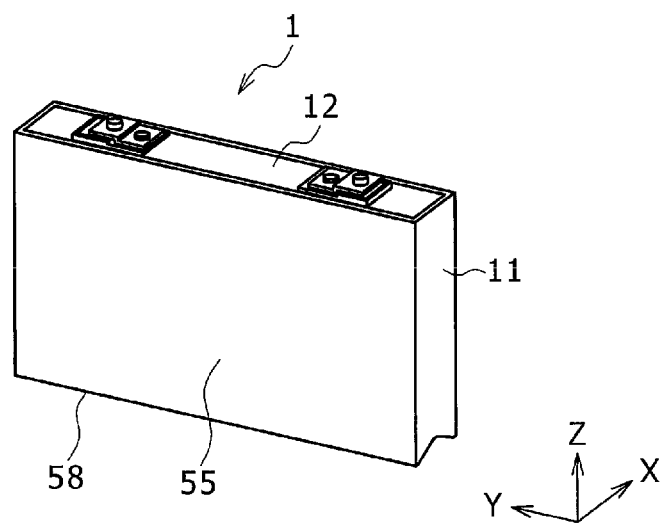
FIG. 1 is a perspective view of a battery according to one exemplary embodiment of the present disclosure.

Hereinafter, an exemplary embodiment according to the present disclosure is described in detail with reference to the accompanying drawings. Note that, in a case where a plurality of exemplary embodiments and modified examples are included in the following, it is assumed from the beginning to construct a new exemplary embodiment by appropriately combining feature parts of these. In the following exemplary embodiment, the same configurations are denoted by the same reference numerals in the drawings, and redundant description are omitted. In addition, a plurality of drawings include schematic views, and dimensional ratios such as a length, a width, and a height of each member do not necessarily coincide between different drawings. In the following description and drawings, an X direction indicates a thickness direction of positive electrode 20 described below, and coincides with a stacking direction of a plurality of positive electrodes 20. A Y direction indicates one direction in a two-dimensional plane in which positive electrode 20 extends, and a Z direction indicates a height direction of exterior casing 11 described below and coincides with a normal direction of a plate part of sealing plate 12 described below. The X, Y, and Z directions are orthogonal to each other. In the present description, an upper side in the height direction is defined as a side of sealing plate 12 in the height direction, and a lower side in the height direction is defined as a side of bottom 58 in the height direction. In the following description, a case where the battery is battery 1, 101, 201, or 301 having stacked electrode group 14 is described as an example, but the battery may be a rectangular secondary battery having a wound electrode group. Alternatively, the battery may be a cylindrical battery. Furthermore, in the following exemplary embodiment, a case where slope 51, 151, or 251 extends in the Y direction is described, but the slope may extend in the X direction. Those configuration elements described in the following that are not recited in independent claims representing the highest concept are illustrated herein as optional configuration elements and are not essential.

Figure 2:
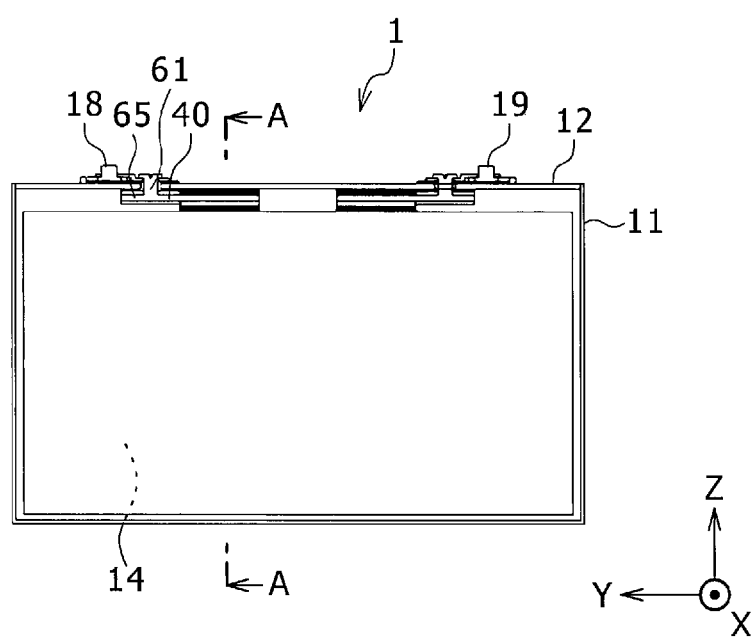
FIG. 2 is a side view of the battery and is a transparent view in which an internal structure is visible.

FIG. 1 is a perspective view of battery 1 according to one exemplary embodiment of the present disclosure (hereinafter, simply referred to as a battery), and FIG. 2 is a side view of battery 1 and is a transparent view in which an internal structure is visible. As illustrated in FIGS. 1 and 2, battery 1 includes rectangular exterior casing (rectangular exterior can) 11 as a case, sealing plate 12, and stacked electrode group 14 (see FIG. 2). Exterior casing 11 is made of, for example, metal, preferably aluminum or an aluminum alloy. As illustrated in FIG. 1, exterior casing 11 includes side wall 55 having a rectangular tubular shape, bottom 58 connected to a lower end (one end) of side wall 55 in a height direction (Z direction), and an opening provided at an upper end (other end) of the side wall. Battery 1 includes insulating sheet 28 (see FIG. 6) having insulating properties, and insulating sheet 28 has a box shape, is opened only on the upper side in the Z direction, and is disposed so as to cover the inner surface of exterior casing 11 except near the opening. Exterior casing 11 may be made of an insulator such as a synthetic resin, and in this case, an insulating sheet can be omitted. As will be described later, electrode group 14 and the like are fixed to sealing plate 12. After electrode group 14 and the like are fixed to sealing plate 12, sealing plate 12 is fitted into the opening of exterior casing 11. By joining the fitted parts of sealing plate 12 and exterior casing 11 by laser welding or the like, sealing plate 12 is integrated with exterior casing 11, and a housing chamber for housing electrode group 14 is defined.

Figure 3:
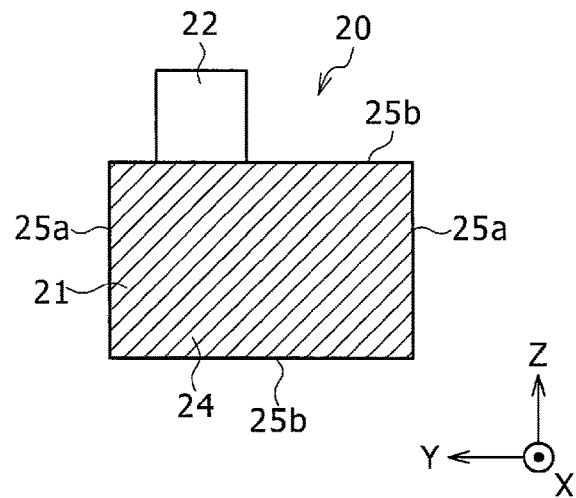
FIG. 3 is a plan view of a positive electrode of the battery as viewed in a thickness direction thereof.
Figure 4:
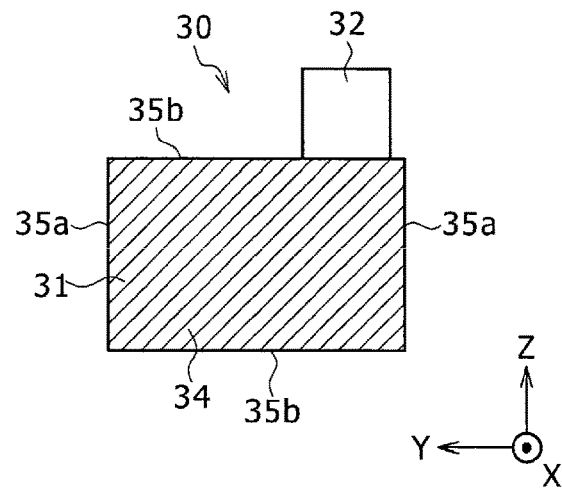
FIG. 4 is a plan view of a negative electrode of the battery as viewed in a thickness direction thereof.
Figure 5:
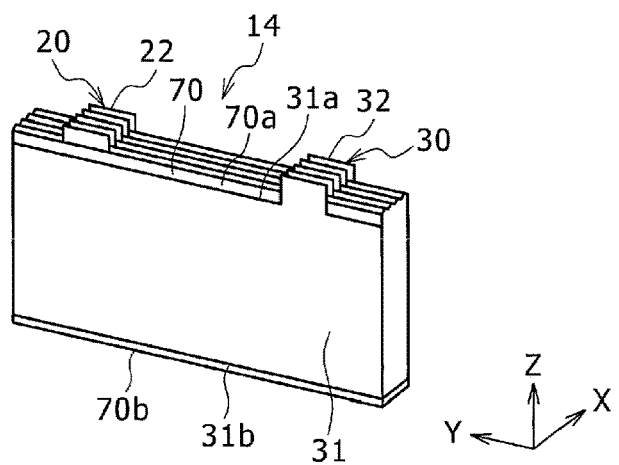
FIG. 5 is a perspective view of an electrode group of the battery.

Electrode group 14 includes a plurality of positive electrodes, a plurality of negative electrodes, and a plurality of separators, and is housed in exterior casing 11. The negative electrodes are disposed on both sides of electrode group 14. Next, structures of the positive electrode, the negative electrode, the separator, and electrode group 14 are described in detail. FIG. 3 is a plan view of positive electrode 20 as viewed from its thickness direction (X direction), and FIG. 4 is a plan view of negative electrode 30 as viewed from its thickness direction (X direction). FIG. 5 is a perspective view of electrode group 14.

As illustrated in FIG. 3, positive electrode 20 includes electrode part 21 and current collector tab 22. Electrode part 21 includes a core body having a flat plate shape and active material layers 24 applied to both surfaces of the core body. Current collector tab 22 protrudes from electrode part 21. In the example illustrated in FIG. 3, electrode part 21 has a substantially rectangular shape in side view. In electrode part 21, one pair of edges 25a extends substantially parallel to the Z direction, and the other pair of edges 25b substantially extends in the Y direction. Positive electrode current collector tab 22 is made of the same material as the positive electrode core body, and may be constituted integrally with the core body. Alternatively, current collector tab 22 may be joined to the core body by using a metal piece separate from the core body. Current collector tab 22 has a substantially rectangular shape in side view, and protrudes upward in the Z direction from one side in the Y direction of upper edge 25b of electrode part 21. Edges of the one pair of current collector tab 22 extends substantially parallel to the Z direction, and edges of the other pair thereof extends substantially parallel to the Y direction.

As illustrated in FIG. 4, negative electrode 30 includes electrode part 31 and current collector tab 32. Electrode part 31 includes a core body having a flat plate shape and active material layers 34 applied to both surfaces of the core body. Current collector tab 32 protrudes from electrode part 31. In the example illustrated in FIG. 4, electrode part 31 has a substantially rectangular shape in side view. In electrode part 31, one pair of edges 35a extends substantially parallel to the Z direction, and the other pair of edges 35b substantially extends in the Y direction. Current collector tab 32 is made of the same material as the core body, and may be constituted integrally with the core body. Alternatively, current collector tab 32 may be joined to the core body by using a metal piece separate from the core body. Current collector tab 32 has a substantially rectangular shape in side view, and protrudes upward in the Z direction from the other side in the Y direction of upper edge 35b of electrode part 31. Edges of the one pair of negative electrode current collector tab 32 extends substantially parallel to the Z direction, and edges of the other pair thereof extends substantially parallel to the Y direction.

With reference to FIG. 5, positive electrode 20 and negative electrode 30 are alternately stacked with separator 70 interposed therebetween in a state where current collector tabs 22 and 32 are disposed so as to protrude upward in the Z direction. Separator 70 has a substantially rectangular shape in side view. Electrode group 14 is constituted by stacking as above. As illustrated in FIGS. 3 and 4, the area of electrode part 31 of the negative electrode in side view is larger than the area of electrode part 21 of the positive electrode in side view, and the area of separator 70 in side view is larger than the area of electrode part 31 of the negative electrode in side view.

As will be described later, electrode group 14 is joined to a positive electrode terminal and a negative electrode terminal disposed in exterior casing 11, and is disposed in exterior casing 11. When viewed in the X direction in a state where electrode group 14 is disposed at a predetermined position, the whole of electrode part 21 of the positive electrode may overlap electrode part 31 of the negative electrode, and electrode part 31 of the negative electrode may have a facing region facing electrode part 21 and an annular non-facing region formed around the facing region and not facing electrode part 21. As viewed in the X direction, the whole of electrode part 31 may overlap separator 70, and separator 70 may have a facing region facing the electrode part 31 and a non-facing region formed around the facing region and not facing the electrode part 31.

The surfaces of positive electrode 20, separator 70, and negative electrode 30 facing each other are substantially parallel to a direction in which bottom 58 of exterior casing 11 and the opening of exterior casing 11 face each other. In a state where electrode group 14 is disposed in exterior casing 11, an extending dimension of first extending part 70a in separator 70 extending upward in the Z direction (toward the side of sealing plate 12 in the Z direction) from upper edge 31a in the Z direction of electrode part 31 of the negative electrode is larger than an extending dimension of second extending part 70b in separator 70 extending downward in the Z direction (toward the side of bottom 58 in the Z direction) from lower edge 31b of electrode part 31. As described above, as viewed in the X direction, the whole of electrode part 21 of the positive electrode overlaps electrode part 31. Therefore, first extending part 70a extends not only from upper edge 31a of negative electrode 30 but also from the upper edge of positive electrode 20 toward the opening in the Z direction, and second extending part 70b extends not only from lower edge 31b of negative electrode 30 but also from the lower edge of positive electrode 20 toward bottom 58 in the Z direction.

The core body and current collector tab 22 of the positive electrode are made of, for example, aluminum or an aluminum alloy foil. Active material layer 24 of the positive electrode can be formed by using, for example, lithium nickel oxide as an active material, acetylene black (AB) as a conductive agent, polyvinylidene fluoride (PVDF) as a binder, and N-methyl-2-pyrrolidone as a dispersion medium. The positive electrode active material is described in more detail. Any of the positive electrode active materials that can reversibly occlude and release lithium ions can be appropriately selected and used. The active material of these positive electrodes is preferably a lithium transition metal composite oxide. For example, a lithium transition metal composite oxide represented by $LiMO_2$ (where M is at least one of cobalt (Co), nickel (Ni), and manganese (Mn)) that can reversibly occlude and release lithium ions, that is, $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, $LiFePO_4$, or the like can be used alone or in combination of two or more thereof. Furthermore, a lithium-cobalt composite oxide to which a different metal element such as zirconium, magnesium, aluminum, or tungsten is added may also be used. However, positive electrode active material-containing layer 24 may be made of any other known material.

Electrode part 21 of the positive electrode is produced, for example, as follows. A conductive agent, a binder, and the like are mixed with the active material of the positive electrode, and the mixture is kneaded in a dispersion medium to prepare a paste-like slurry. Thereafter, the slurry is applied onto the core body of the positive electrode. Subsequently, the slurry applied to the core body is dried and compressed to form electrode part 21.

The core body of the negative electrode and current collector tab 32 are made of, for example, copper or a copper alloy foil. The active material of the negative electrode included in active material layer 34 of the negative electrode is not particularly limited as long as the active material can reversibly occlude and release lithium, and for example, a carbon material, a silicon material, lithium metal, metal or an alloy material to be alloyed with lithium, a metal oxide, or the like can be used. From the viewpoint of material cost, it is preferable to use a carbon material for the negative electrode active material, and for example, natural graphite, artificial graphite, mesophase pitch-based carbon fiber (MCF), mesocarbon microbeads (MCMB), coke, hard carbon, and the like can be used. In particular, from the viewpoint of improving high rate charge and discharge characteristics, it is preferable to use, as the negative electrode active material, a carbon material obtained by coating a graphite material with low crystalline carbon.

Active material layer 34 of the negative electrode is preferably formed using a styrene-butadiene copolymer rubber particle dispersion (SBR) as a binder, carboxymethyl cellulose (CMC) as a thickener, and water as a dispersion medium. Electrode part 31 of the negative electrode is produced, for example, as follows. A conductive agent, a binder, and the like are mixed with the active material of the negative electrode, and the mixture is kneaded in a dispersion medium to prepare a paste-like negative electrode active material slurry. Thereafter, the slurry is applied onto the core body of the negative electrode. Subsequently, the slurry applied to the core body is dried and compressed to form the negative electrode active material disposing part 31.

As separator 70, a known separator generally used in a non-aqueous electrolyte secondary battery can be used. For example, a separator made of polyolefin is used. Specifically, not only the separator made of polyethylene but also a separator in which a layer made of polypropylene is formed on a surface of polyethylene or a separator in which an aramid-based resin is applied to a surface of a separator made of polyethylene may be used.

An inorganic filler layer may be formed at an interface between positive electrode 20 and separator 70 or an interface between negative electrode 30 and separator 70. As the filler, an oxide or a phosphoric acid compound using such as titanium, aluminum, silicon, or magnesium alone or in combination, or a filler whose surface is treated with a hydroxide or the like can be used. The filler layer may be formed by directly applying a filler-containing slurry to positive electrode 20, negative electrode 30, or separator 70, or may be formed by attaching a sheet formed of the filler to positive electrode 20, negative electrode 30, or separator 70.

Figure 6:
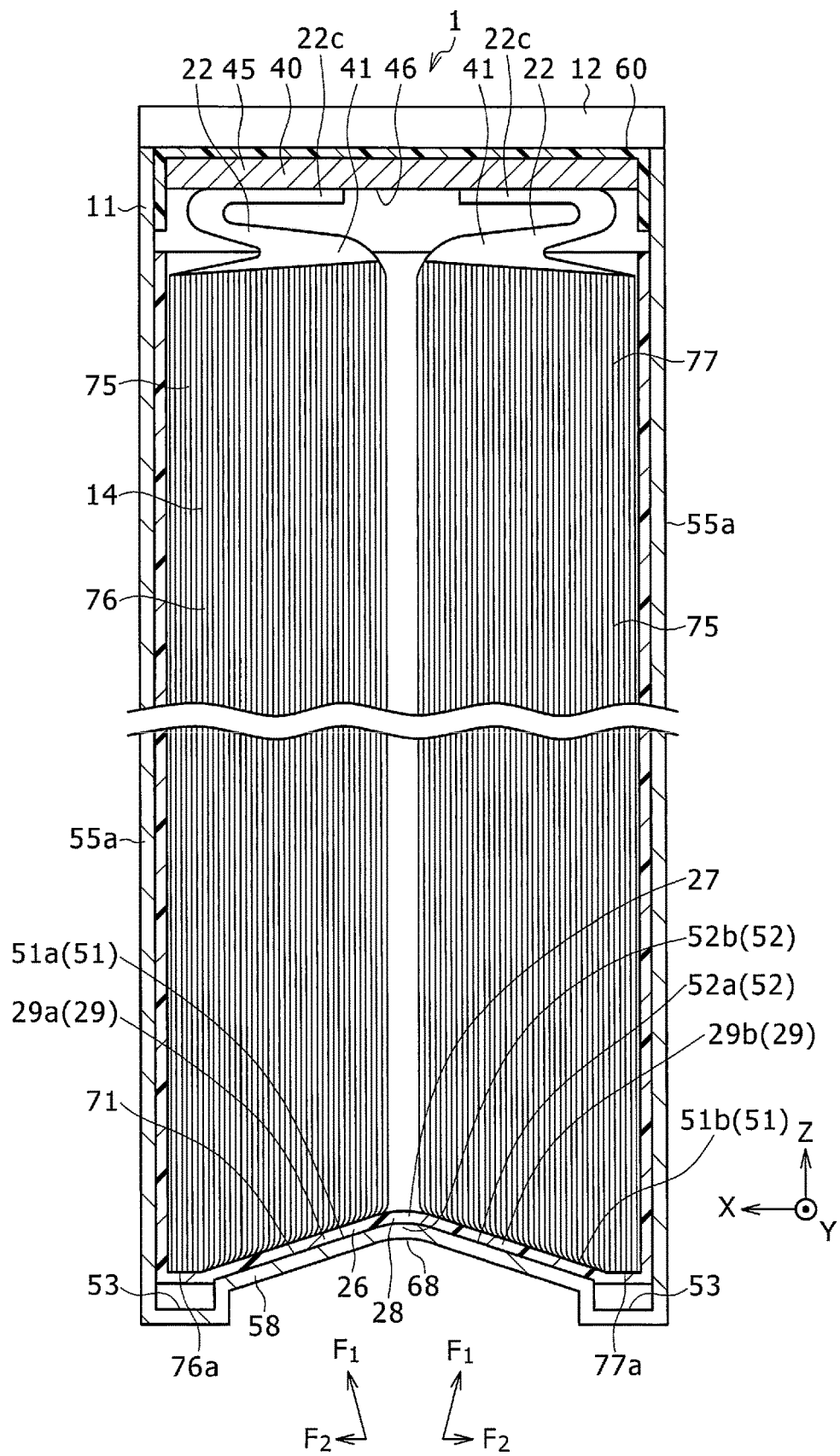
FIG. 6 is a cross-sectional view taken along line A-A in FIG. 2.

FIG. 6 is a cross-sectional view taken along line A-A in FIG. 2. Next, an example of a structure for attaching electrode group 14 to sealing plate 12 is briefly described with reference to FIGS. 2 and 6. The attachment structure of electrode group 14 to sealing plate 12 is not limited to the following attachment structure, and any structure in which electrode group 14 can be attached to sealing plate 12 may be adopted.

As illustrated in FIG. 6, battery 1 includes current collector terminal 40 of the positive electrode and resin insulating cover 60. Current collector terminal 40 is disposed in exterior casing 11 and extends in the X direction. In the present exemplary embodiment, the plurality of current collector tabs 22 of the positive electrodes included in the plurality of positive electrodes 20 are divided into two and disposed so as to overlap each other to form two bundles, and each of the two bundles constitutes tab bundle 41 of the positive electrode. Current collector terminal 40 may be made of aluminum or an aluminum alloy. Current collector terminal 40 has plate part 45, and plate part 45 is disposed substantially parallel to the plate part of sealing plate 12. Plate part 45 faces sealing plate 12 in the Z direction.

As illustrated in FIG. 6, current collector tab 22 of the positive electrode has flat part 22c extending along lower surface 46 of plate part 45. In flat part 22c, all of positive electrode current collector tabs 22 included in tab bundle 41 are overlapped substantially in the Z direction. Flat part 22c is joined to lower surface 46 of plate part 45 by ultrasonic welding, laser welding, tungsten inert gas (TIG) welding, resistance welding, or the like, and is electrically connected to plate part 45. In other words, a joint between each current collector tab 22 and current collector terminal 40 of the positive electrode is included in flat part 22c.

With reference to FIGS. 2 and 6, current collector terminal 40 of the positive electrode has external terminal connector 65 on one side in the Y direction of the joint of current collector tab 22. External terminal connector 65 has, for example, cylindrical rivet 61 protruding upward from plate part 45, and is electrically connected to external terminal 18 of the positive electrode provided outside sealing plate 12 through rivet 61. As illustrated in FIG. 2, rivet 61 is inserted into a through-hole provided in sealing body 12 in a state of being insulated from sealing body 12, and is also inserted into a through hole provided in external terminal 18. Rivet 61 is inserted in a state where insulating cover 60 (see FIG. 6) made of an insulator such as resin is disposed between current collector terminal 40 of the positive electrode and sealing plate 12. Additionally, rivet 61 and plate part 45 may be prepared separately, and rivet 61 and plate part 45 may be electrically connected and fixed by caulking, welding, or the like in the process of producing battery 1.

Rivet 61 is caulked after the insertion is performed. By this caulking, rivet 61, insulating cover 60, sealing plate 12, and external terminal 18 of the positive electrode are integrated, and rivet 61 of current collector terminal 40 is electrically connected to external terminal 18. As described above, positive electrode 20 is joined to current collector terminal 40. Accordingly, the plurality of positive electrodes 20, current collector terminal 40, insulating cover 60, and sealing plate 12 are integrated by caulking of rivet 61. Although the description is omitted, the plurality of negative electrodes 30, the current collector terminal of the negative electrode made of copper (not illustrated), insulating cover 60, sealing plate 12, and external terminal 19 of the negative electrode (see FIG. 2) are also integrated by the same structure as that on the positive electrode. As a result, electrode group 14, current collector terminal 40 of the positive electrode, the current collector terminal of the negative electrode, insulating cover 60, and sealing plate 12 are integrated together to constitute an integrated structure. Although the case where current collector terminal 40 of the positive electrode is integrated with sealing plate 12 by caulking has been described, the current collector terminal of the positive electrode may be fixed to the sealing plate by other joining means such as welding or screwing.

In the integrated structure, in a state where electrode group 14 (see FIG. 5) is disposed on the lower side in the Z direction, the integrated structure is relatively moved downward in the Z direction with respect to exterior casing 11, and the parts other than sealing plate 12 are inserted into exterior casing 11. Thereafter, as described above, sealing plate 12 is joined to the edge near the opening of exterior casing 11 by laser welding or the like.

After the attachment of the integrated structure to exterior casing 11 is completed, the non-aqueous electrolyte solution is injected through an injection hole (not illustrated) provided in sealing plate 12. Thereafter, predetermined charging is performed using external terminals 18 and 19 (see FIG. 2) of the positive electrode and the negative electrode to generate in advance a reaction gas generated by a charging reaction of the battery, and then the injection hole is sealed to produce battery 1. The injection hole may be sealed by, for example, a blind rivet or welding.

The solvent of the non-aqueous electrolyte is not particularly limited, and a solvent conventionally used in a non-aqueous electrolyte secondary battery can be used. Examples of the solvent that can be used include: cyclic carbonates such as ethylene carbonate (EC), propylene carbonate (PC), butylene carbonate, and vinylene carbonate (VC); chain carbonates such as dimethyl carbonate (DMC), methyl ethyl carbonate (MEC), and diethyl carbonate (DEC); compounds containing an ester such as methyl acetate, ethyl acetate, propyl acetate, methyl propionate, ethyl propionate, and γ-butyrolactone; compounds containing a sulfonic group, such as propane sultone; compounds containing ether such as 1,2-dimethoxyethane, 1,2-diethoxyethane, tetrahydrofuran, 1,2-dioxane, 1,4-dioxane, and 2-methyltetrahydrofuran; compounds containing a nitrile such as butyronitrile, valeronitrile, n-heptanenitrile, succinonitrile, glutarnitrile, adiponitrile, pimelonitrile, 1,2,3-propanetricarbonitrile, 1,3,5-pentanetricarbonitrile; and compounds containing an amide such as dimethylformamide. In particular, a solvent in which a part of hydrogen (H) is substituted with fluorine (F) may be used. In addition, these solvents can be used alone or in combination of two or more thereof, and in particular, may be a solvent obtained by combining a cyclic carbonate and a chain carbonate, or a solvent obtained by further combining these solvents with a small amount of a nitrile-containing compound or an ether-containing compound.

In addition, an ionic liquid can be used as the non-aqueous solvent of the non-aqueous electrolyte, and in this case, cation species and anion species are not particularly limited, but from the viewpoint of low viscosity, electrochemical stability, and hydrophobicity, a combination using a pyridinium cation, an imidazolium cation, and a quaternary ammonium cation as the cation, and a fluorine-containing imide-based anion as the anion may be used.

Furthermore, as a solute used for the non-aqueous electrolyte, a known lithium salt generally used in the non-aqueous electrolyte secondary battery can be used. As such a lithium salt, a lithium salt containing one or more elements among phosphorous (P), boron (B), F, oxygen (O), sulfur (S), nitrogen (N), and chlorine (CO can be used, and specifically, lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and $LiPF_2O_2$, and mixtures thereof can be used.

As the solute, a lithium salt having an oxalato complex as an anion can also be used. As the lithium salt having this oxalato complex as an anion, in addition to lithium-bis (oxalate) borate (LiBOB), a lithium salt having an anion in which $C2O4^{2-}$ is coordinated to the central atom, for example, a salt represented by $Li[M(C_2O_4)_xR_y]$ (where M is a transition metal, an element selected from groups 13, 14, and 15 of the periodic table, R is a group selected from a halogen, an alkyl group, and a halogen-substituted alkyl group, x is a positive integer, and y is 0 or a positive integer) can be used. Specific examples thereof include $Li[B(C_2O_4)F_2]$, $Li[P(C_2O_4)F_4]$, and $Li[P(C_2O_4)_2F_2]$.

With reference to FIG. 6 again, exterior casing 11 has, on inner surface 71 of bottom 58, slope 51 inclined with respect to a plane (XY plane) orthogonal to the Z direction. Slope 51 extends from one end in the Y direction to the other end in the Y direction of bottom 58. Slope 51 includes first slope 51a and second slope 51b. First slope 51a is displaced toward the side of sealing plate 12 in the Z direction from one side in the X direction toward the center in the X direction, and second slope 51b is displaced toward the side of sealing plate 12 in the Z direction from the other side in the X direction toward the center in the X direction. In the present exemplary embodiment, there is a virtual straight line extending in the X direction and intersecting both first slope 51a and second slope 51b.

In the present exemplary embodiment, in the cross section illustrated in FIG. 6, each of first and second slopes 51a and 51b extends substantially linearly. However, in the cross section extending in the X direction and the Z direction, a curve may be included in a part of at least one of the first and second slopes drawn by a straight line. In the present exemplary embodiment, first slope 51a and second slope 51b are substantially plane-symmetrical with respect to a plane extending in the Y direction and the Z direction and perpendicularly bisecting bottom 58. However, the first slope and the second slope may not be substantially plane-symmetrical with respect to the plane.

As illustrated in FIG. 6, bottom 58 has, at the center part in the X direction, protrusion 52 protruding from parts located at both ends in the X direction toward the side of sealing plate 12 in the Z direction. Upper surface 52a of protrusion 52 is a convex surface protruding toward the side of sealing plate 12 in the Z direction, and the center part in the X direction is located closest to sealing plate 12 in the Z direction. Exterior casing 11 has grooves 53 recessed from protrusion 52, between a pair of side walls 55a and protrusion 52 in the X direction, the side walls being located at ends in the X direction and substantially parallel to the YZ plane. Grooves 53 are located on both sides of protrusion 52 in the X direction. Each groove 53 extends in the Y direction from one end to the other end in the Y direction of bottom 58. Protrusion 52 may be formed by any method, but the structure of bottom 58 having grooves 53 can be easily formed by pressing the center part in the X direction of bottom 58 from the back surface to the side of sealing plate 12 in the Z direction. Note that slope 51a and second slope 51b of the present exemplary embodiment are formed on upper surface 52a of protrusion 52.

Electrode group 14 of the present exemplary embodiment includes a plurality of electrode units including positive electrodes 20 and negative electrodes 30. More specifically, electrode group 14 includes first electrode unit 76 and second electrode unit 77 adjacent to each other in the X direction. In each of electrode units 76 and 77, positive electrode 20 and negative electrode 30 face each other in the X direction as the stacking direction, and electrode units 76 and 77 are arranged in the X direction. The plurality of current collector tabs 22 of positive electrodes 20 included in each of electrode units 76 and 77 constitute tab bundle 41 for each electrode unit.

As illustrated in FIG. 6, insulating sheet 28 covers electrode group 14 and is interposed between exterior casing 11 and electrode group 14. Insulating sheet 28 may be formed by folding one insulating sheet, or may be a case having a tube and a bottom that closes one end of the tube. In the insulating sheet, a plurality of separated sheets may be disposed so as to cover the inner surface of exterior casing 11. Insulating sheet 28 has contact part 26 that extends along slope 51 so as to follow slopes 51a and 51b and comes into contact with slope 51.

In order for contact part 26 of insulating sheet 28 to easily follow slope 51, contact part 26 may have a fold at an appropriate position. Contact part 26 may protrude, at the center part in the X direction, toward the side of sealing plate 12 in the Z direction from parts located at both ends in the X direction along the shape of protrusion 52 of exterior casing 11. Contact part 26 has interposed part 29 interposed between electrode group 14 and slope 51. Interposed part 29 includes a lower surface substantially parallel to slope 51. Interposed part 29 is included in protrusion 27. Interposed part 29 includes first interposed part 29a extending along first slope 51a and second interposed part 29b extending along second slope 51b.

Each of electrode group 14 and slope 51 is in contact with interposed part 29. More specifically, the first electrode unit 76 and first slope 51a are in contact with first interposed part 29a, and second electrode unit 77 and second slope 51b are in contact with second interposed part 29b. In other words, first electrode unit 76 is in thermal contact with first slope 51a through first interposed part 29a, and second electrode unit 77 is in thermal contact with second slope 51b through second interposed part 29b. Protrusion 52 of exterior casing 11 has distal end 52b that protrudes upward from lower end 76a of first electrode unit 76 and lower end 77a of second electrode unit 77, between first electrode unit 76 and second electrode unit 77 in the X direction. Distal end 52b may be formed of a sharp protrusion, and may include a flat surface or a curved surface extending in the X direction and the Y direction. Further, an upper end of distal end 52b may be located below or above an upper end of the surface of electrode unit 75 facing bottom 58 in the Z direction. In the above, the case where electrode unit 75 includes first electrode unit 76 and second electrode unit 77 adjacent to each other in the X direction has been described. However, the electrode group of the present disclosure is not limited to this configuration. The electrode unit may include three or more electrode units. In FIG. 6, bottom 58 of insulating sheet 28 and the inner surface of groove 53 are not in contact with each other, but the bottom of insulating sheet 28 having a case shape may be in contact with not only protrusion 52 of exterior casing 11 but also the inner surface of groove 53.

As described above, according to battery 1, slope 51 inclined with respect to the XY plane orthogonal to the Z direction is provided on inner surface 71 of bottom 58 of exterior casing 11. Therefore, electrode group 14 is easily brought into thermal contact with bottom 58, and the heat generated in electrode group 14 can be more actively released through bottom 58. Furthermore, electrode group 14 indirectly receives a normal force in a direction inclined with respect to the YZ plane indicated by arrow F1 in FIG. 6 from slope 51 through insulating sheet 28. Therefore, electrode group 14 is pressed by side walls 55a located at ends of exterior casing 11 in the X direction and extending in the Y direction by force F2 which is an X direction component of the normal force. Therefore, electrode group 14 can also be brought into thermal contact with side walls 55a, and the heat generated in electrode group 14 can be more actively released through side walls 55a. Accordingly, the heat dissipation effect of battery 1 can be greatly improved.

Further, electrode group 14 includes first electrode unit 76 and second electrode unit 77, first electrode unit 76 is in thermal contact with first slope 51a through first interposed part 29a, and second electrode unit 77 is in thermal contact with second slope 51b through second interposed part 29b. In addition, first slope 51a and second slope 51b are substantially plane-symmetrical with respect to a plane including the Y direction and the Z direction and perpendicularly bisecting bottom 58. Therefore, first electrode unit 76 easily approaches side wall 55a close to the lower end of first slope 51a among the upper end and the lower end of the slope of first slope 51a. In addition, second electrode unit 77 easily approaches side wall 55a close to the lower end of second slope 51b among the upper end and the lower end of the slope of second slope 51b. Therefore, first electrode unit 76 can not only be brought into thermal contact with first slope 51a, but can also be actively brought into contact with side wall 55a extending in the Y direction on one side in the X direction and be brought into thermal contact with side wall 55a on one side in the X direction. Furthermore, second electrode unit 77 can not only be brought into thermal contact with second slope 51b, but can also be actively brought into contact with side wall 55a extending in the Y direction on the other side in the X direction and be brought into thermal contact with side wall 55a on the other side in the X direction. Accordingly, electrode group 14 can not only be brought into thermal contact with bottom 58, but can also be brought into thermal contact with two side walls 55a parallel to the YZ plane having a particularly large capacity (in other words, having a large contact area with electrode group 14) in exterior casing 11. Therefore, the heat generated in electrode group 14 can be diffused through bottom 58 and two side walls 55a. As a result, the heat generated in electrode group 14 can be efficiently released to exterior casing 11, and the cooling effect of electrode group 14 can be increased. The case where the protrusion of bottom 58 is provided in the exterior casing 11 and between the plurality of electrode units 76 and 77 arranged in the X direction, and the pair of side walls 55a extending in the Y direction and the Z direction in exterior casing 11 are brought into thermal contact with electrode units 76 and 77 has been described. However, in the exterior casing, the protrusion of the bottom may be provided between the plurality of electrode units arranged in the Y direction, and the pair of side walls extending in the X direction and the Z direction in the exterior casing may be brought into thermal contact with the electrode units.

Further, interposed part 29 of insulating sheet 28 may have a lower surface substantially parallel to slope 51. Further, in a state where electrode group 14 is disposed in exterior casing 11, an extending dimension of first extending part 70a extending upward in the Z direction from upper edge 31a in the Z direction of electrode part 31 of the negative electrode in separator 70 is larger than an extending dimension of second extending part 70b extending downward in the Z direction from lower edge 31b of electrode part 31 in separator 70. Therefore, electrode group 14 can be brought into close contact with slope 51 with interposed part 29 interposed therebetween, and also separator 70 can be prevented from inhibiting the close contact of positive electrode 20 and negative electrode 30 with interposed part 29. Accordingly, the heat generated by positive electrode 20 and negative electrode 30 in electrode group 14 can be more efficiently released to the outside through slope 51.

Note that the present disclosure is not limited to the above-described exemplary embodiment and the modified examples thereof, and various improvements and changes are possible within the matters described in the claims of the present application and the equivalent scope thereof.

Figure 7:
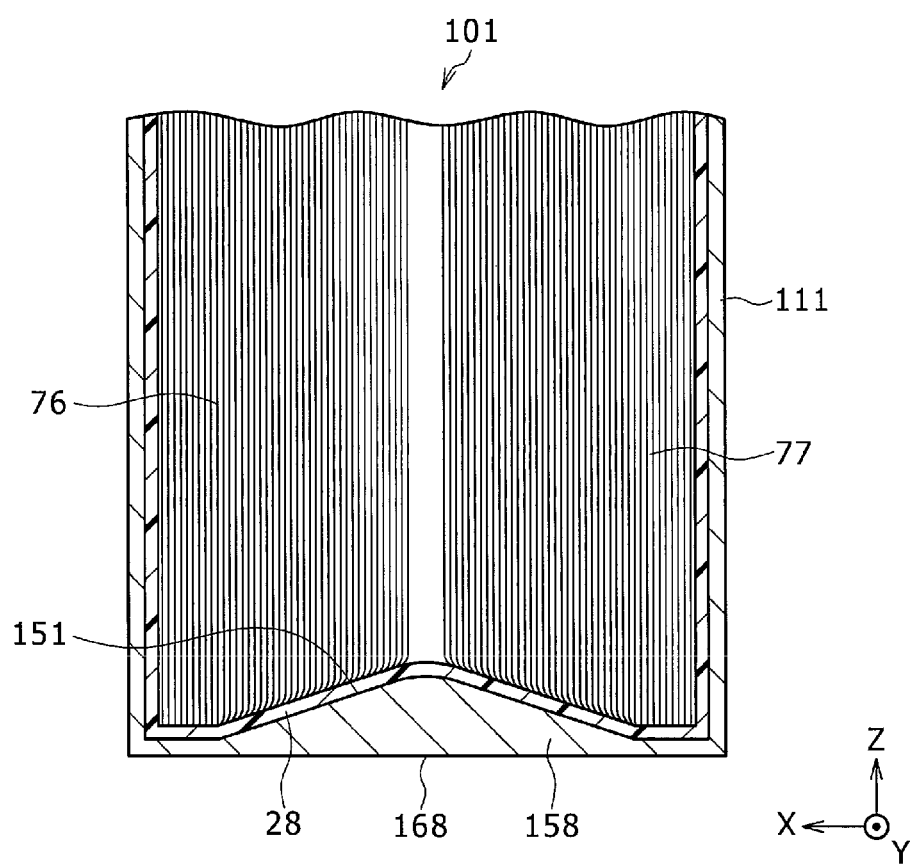
FIG. 7 is a lower part of a cross-sectional view corresponding to FIG. 6 in a battery of a modified example.

FIG. 7 is a lower part of the cross-sectional view of battery 101 according to the modified example corresponding to FIG. 6. In the above exemplary embodiment, the case where protrusion 52 is formed by pressing and recessing bottom 58 from the lower side, and lower surface (external surface) 68 of bottom 58 is recessed upward in the Z direction has been described. However, as illustrated in the lower part in FIG. 7, lower surface 168 of bottom 158 of exterior casing 111 may be formed of a plane (XY plane) extending so as to be substantially orthogonal to the Z direction. The Z direction thickness of bottom 158 may vary depending on the X direction position. A configuration may be adopted in which slope 151 inclined with respect to a plane orthogonal to the Z direction is present on the upper surface of bottom 158. In the electrode groups illustrated in FIGS. 6 and 7, a gap extending in the Y direction and the Z direction are formed between the plurality of electrode units. However, the present invention is not limited to this configuration. A member having excellent heat dissipation properties or an insulating member may be interposed in the gap.

Further, the case where inner surface 71 of bottom 58 has first and second slopes 51a and 51b that are substantially plane-symmetrical with respect to the plane bisecting the X direction has been described. Still further, the case where electrode group 14 includes two first and second electrode units 76 and 77, and first electrode unit 76 is in thermal contact with first slope 51a while first electrode unit 76 is in thermal contact with second slope 51b has been described. However, these configurations may not be adopted as described below.

Figure 8:
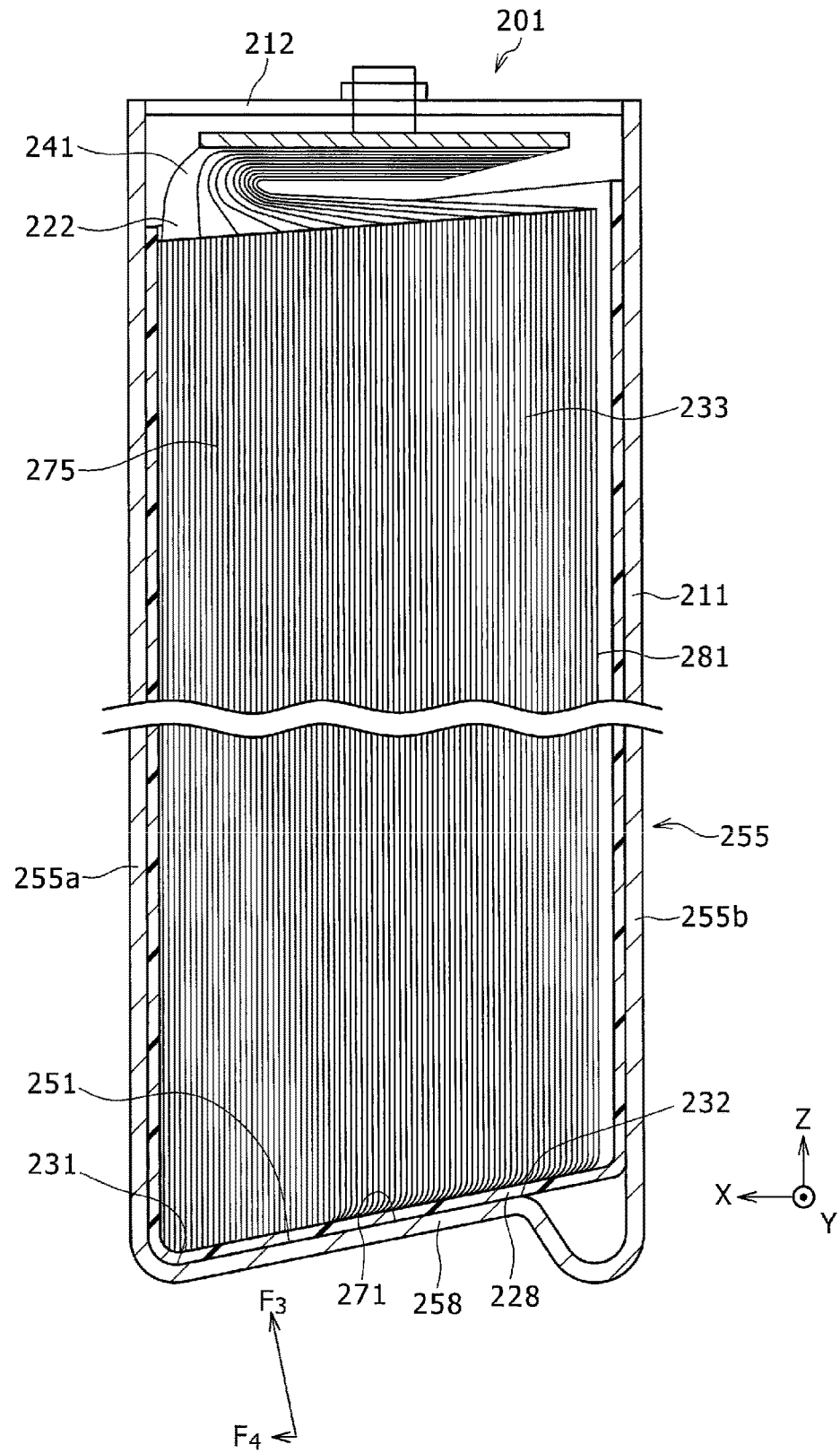
FIG. 8 is a cross-sectional view corresponding to FIG. 6 in a battery of another modified example.
Figure 9:
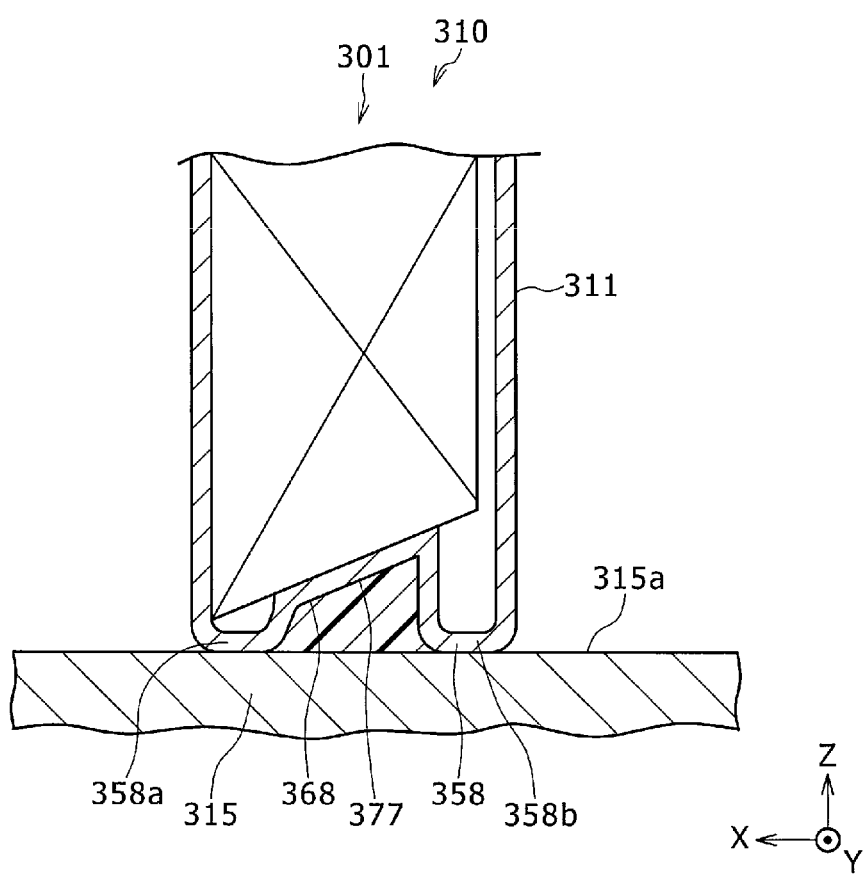
FIG. 9 is a schematic cross-sectional view of a battery module including a battery of yet another modified example.

FIG. 8 is a cross-sectional view of battery 201 according to another modified example corresponding to FIG. 6. As illustrated in FIG. 8, inner surface 271 of bottom 258 of exterior casing 211 may have only one slope 251. Then, only one slope 251 may be displaced upward in the Z direction (toward the side of sealing plate 212 in the Z direction) from one side to the other side in the X direction. In addition, electrode group 233 may be included in only one electrode unit 275, and all of current collector tabs 222 of the positive electrodes and current collector tabs of the negative electrodes (not illustrated) of the electrode group 233 may be bundled together to constitute one tab bundle 241 of the positive electrode and one tab bundle of the negative electrode (not illustrated).

Then, electrode group 233 may indirectly receive force F4 which is the X direction component of normal force F3 of slope 251 through insulating sheet 228, and be pressed toward first wall 255a located on one side in the X direction and extending in the Y direction. More specifically, electrode group 233 may have facing part 281 facing side wall 255 of exterior casing 211 in the orthogonal direction orthogonal to the Z direction. Further, slope 251 may have lower end 231 and upper end 232 in the Z direction. Side wall 255 may have first wall 255a closer to lower end 231 than to upper end 232 and second wall 255b closer to upper end 232 than to lower end 231. Still further, electrode group 233 may be closer to first wall 255a than to second wall 255b.

In this manner, by providing only one slope 251 on inner surface 271 of bottom 258, electrode group 233 may be brought into thermal contact with bottom 258 through insulating sheet 228 and may be brought into thermal contact with first wall 255a through insulating sheet 228. Then, the heat generated in electrode group 233 may be effectively released using bottom 258 and first wall 255a on one side in the X direction.

According to the present modified example, electrode group 233 can be intentionally pressed toward the side of first wall 255a located on one side in the X direction, and the side wall that dissipates the heat generated in electrode group 233 can be controlled. Therefore, when the heat is released using a cooling plate, the cooling plate is disposed so as to be in contact with first wall 255a on one side in the X direction through which the heat is released, while the cooling plate is not disposed on the outer side in the X direction of second wall 255b. Therefore, according to the present modified example, not only the effective cooling of the electrode group 233 can be executed, but also a number of cooling plates can be reduced to achieve reduction in manufacturing cost and compactness.

In addition, when the center part in the X direction on the bottom surface of the bottom is recessed upward in the height direction by performing pressing, a heat transfer sheet may be attached to both ends in the X direction to make the bottom surface of the battery flat. In this case, a space surrounded by the heat transfer sheet and the bottom surface of the bottom may be filled with a heat transfer material to promote the heat dissipation effect.

In this case, a heat dissipation gel may be used as the heat transfer material. The heat dissipation gel includes, for example, a base material and particles (fillers) of metal or metal oxide substantially uniformly dispersed in the base material. The base material is used to secure insulation and fill fine gaps without leaving any gap. On the other hand, the filler is made of particles having high thermal conductivity, and is used for improving heat transfer property. The base material may be made of, for example, a gel (grease) such as silicone. In addition, the filler may be made of copper, silver, aluminum, alumina, magnesium oxide, aluminum nitride, a mixture thereof, or the like, and a simple substance or a mixture thereof may be dispersed in the base material by a dispersion method corresponding to the particle diameter. In the case of the heat dissipation gel being a material having viscosity around that of clay, leakage from between the heat transfer sheet and the bottom surface of the bottom can be suppressed. As the heat transfer material, a thermosetting resin or the like may be used.

Furthermore, as illustrated in FIG. 12, that is, a schematic cross-sectional view of battery module 310 including battery 301 of a further modified example, upper surface 315a of cooling plate 315 may be fixed to both ends 358a and 358b of bottom 358 in the X direction of bottom surface 368 in exterior casing 311 constituting a case by fixing means, for example, welding, an adhesive, screwing, or the like, instead of the heat transfer sheet. Further, heat transfer material housing chamber 377 may be defined between upper surface 315a of cooling plate 315 and bottom surface 368 of bottom 358. Then, by filling the heat transfer material with a heat transfer material such as a heat dissipation gel, the heat dissipation effect may be further enhanced. In FIGS. 6 to 8 illustrating the present exemplary embodiment, the electrode group includes a plurality of straight lines extending in the Z direction. However, each straight line does not accurately depict edges of the positive electrode, the negative electrode, and the separator.

REFERENCE MARKS IN THE DRAWINGS 1, 101, 201, 301: battery
11, 111, 211, 311: exterior casing
14, 233: electrode group
27: protrusion
28, 228: insulating sheet
29: interposed part
29a: first interposed part
29b: second interposed part
30: negative electrode
51, 151, 251: slope
51a: first slope
51b: second slope
53: groove
55, 55a, 255: side wall
58, 158, 258, 358: bottom
70: separator
70a: first extending part
70b: second extending part
71, 271: inner surface
75, 275: electrode unit
76: first electrode unit
77: second electrode unit
76a: lower end of first electrode unit
77a: lower end of second electrode unit
231: lower end
232: upper end
255a: first wall
255b: second wall
281: facing part

The invention claimed is:

1. A battery comprising:
an electrode group; and
a case that houses the electrode group and includes a side wall, a bottom connected to a lower end of the side wall in a height direction, and an opening provided at an upper end of the side wall,
wherein the bottom includes an inner surface that includes a slope inclined with respect to a plane orthogonal to the height direction,
the electrode group is in thermal contact with the slope,
the slope incudes a first slope and a second slope, the first slope includes a lower end and an upper end, the second slope includes a lower end and an upper end, the upper end of the first slope and the upper end of the second slope are connected to each other at a center of the bottom, the upper end of the first slope and the upper end of the second slope are closer to the upper end of the side wall in the height direction than the lower end of the first slope and the lower end of the second slope.

2. The battery according to claim 1, wherein
the bottom of the case includes a protrusion protruding inward in the height direction of the case, and
the slope is disposed in the protrusion.

3. The battery according to claim 2, wherein the case includes a groove recessed from the protrusion between the protrusion and the side wall.

4. The battery according to claim 1, wherein
the side wall includes a first wall closer to the lower end of the first slope than to the upper end of the first slope and a second side wall closer to the upper end of the first slope than to the lower end of the first slope, and
the electrode group is closer to the first wall than to the second wall.

5. The battery according to claim 4, wherein
the electrode group includes a facing part facing the side wall of the case in an orthogonal direction orthogonal to the height direction, and
the facing part is in thermal contact with the first wall.

6. The battery according to claim 2, wherein
the electrode group includes a plurality of electrode units each including a positive electrode and a negative electrode,
in each of the electrode units, the positive electrode and the negative electrode face each other in a stacking direction,
the plurality of electrode units are arranged in the stacking direction,
the plurality of electrode units include a first electrode unit and a second electrode unit adjacent to each other in the stacking direction, and
the first slope is in thermal contact with the first electrode unit and the second slope is in thermal contact with the second electrode unit.

7. The battery according to claim 6, wherein the protrusion includes a distal end between the first electrode unit and the second electrode unit, the distal end protruding upward from a lower end of the first electrode unit and a lower end of the second electrode unit.

8. The battery according to claim 1, wherein
the electrode group includes a positive electrode of a sheet form, a negative electrode of a sheet form, and a separator of a sheet form interposed between the positive electrode and the negative electrode, and the positive electrode, the separator, and the negative electrode face each other at a surface that is substantially parallel to a direction in which the bottom and the opening of the case face each other,
the separator has a first extending part extending from an edge of the positive electrode and an edge of the negative electrode toward the bottom in the height direction, and a second extending part extending from the edge of the positive electrode and the edge of the negative electrode toward the opening, and
the first extending part extends by a dimension larger than a dimension that the second extension part extends.

9. The battery according to claim 1, further comprising an insulating sheet that covers the electrode group and is interposed between the case and the electrode group,
wherein the insulating sheet includes an interposed part interposed between the electrode group and the slope, and the interposed part includes a surface substantially parallel to the slope.

10. A battery comprising:
an electrode group; and
a case that houses the electrode group and includes a side wall, a bottom connected to a lower end of the side wall in a height direction, and an opening provided at an upper end of the side wall,
wherein the bottom includes an inner surface that includes a slope inclined with respect to a plane orthogonal to the height direction, the electrode group is in thermal contact with the slope,
the bottom of the case includes a protrusion protruding inward in the height direction of the case,
the slope is disposed in the protrusion,
the electrode group includes a plurality of electrode units each including a positive electrode and a negative electrode,
in each of the electrode units, the positive electrode and the negative electrode face each other in a stacking direction,
the plurality of electrode units are arranged in the stacking direction,
the plurality of electrode units include a first electrode unit and a second electrode unit adjacent to each other in the stacking direction,
the slope includes a first slope in thermal contact with the first electrode unit and a second slope in thermal contact with the second electrode unit, and
a slope of the first slope and a slope of the second slope are closer to an upper end in the height direction from the side wall toward a center of the case in the stacking direction of the case.

\* \* \* \* \*